US012477296B2

(12) United States Patent
Falk et al.

(10) Patent No.: US 12,477,296 B2
(45) **Date of Patent: *Nov. 18, 2025**

(54) SPATIALLY-BOUNDED AUDIO ELEMENTS WITH INTERIOR AND EXTERIOR REPRESENTATIONS

(71) Applicant: Telefonaktiebolaget LM Ericsson (publ), Stockholm (SE)

(72) Inventors: Tommy Falk, Spånga (SE); Werner De Bruijn, Stockholm (SE); Erlendur Karlsson, Uppsala (SE); Tomas Jansson Toftgård, Uppsala (SE); Mengqiu Zhang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,406

(22) Filed: Feb. 15, 2024

(65) Prior Publication Data

US 2024/0276168 A1 Aug. 15, 2024

Related U.S. Application Data

(63) Continuation of application No. 17/421,673, filed as application No. PCT/EP2019/086876 on Dec. 20, 2019, now Pat. No. 11,930,351.

(Continued)

(51) Int. Cl.
*H04S 7/00* (2006.01)
*H04R 3/00* (2006.01)

(52) U.S. Cl.
CPC ............. *H04S 7/303* (2013.01); *H04R 3/005* (2013.01); *H04S 7/301* (2013.01); *H04S 2400/11* (2013.01); *H04S 2400/15* (2013.01)

(58) Field of Classification Search
None
See application file for complete search history.

(56) References Cited

U.S. PATENT DOCUMENTS

2015/0117664 A1* 4/2015 Mossner .................. G09B 5/04 381/74
2018/0332420 A1 11/2018 Salume
(Continued)

FOREIGN PATENT DOCUMENTS

WO 2009/109217 9/2009
WO 2011/101708 8/2011
WO 2014/053875 4/2014

OTHER PUBLICATIONS

International Search Report and Written Opinion dated Mar. 5, 2020 in International Application No. PCT/EP2019/086876 (12 pages total).

(Continued)

*Primary Examiner* — Qin Zhu
(74) *Attorney, Agent, or Firm* — Rothwell, Figg, Ernst & Manbeck, P.C.

(57) ABSTRACT

A method of audio rendering. The method includes receiving an audio element, wherein the audio element comprises: i) an interior representation that is valid within a spatial region, the interior representation of the audio element being in a listener-centric format and ii) information indicating the spatial region. The method further includes determining that a listener is outside the spatial region. The method further includes deriving an exterior representation of the audio element and rendering the audio element using the exterior representation of the audio element. In another aspect, a method of providing a spatially-bounded audio element is provided. The method includes providing, to a rendering node, an audio element. The audio element includes: (i) an interior representation that is valid within a spatial region, (Continued)

the interior representation being in a listener-centric format; and (ii) information indicating the spatial region.

11 Claims, 9 Drawing Sheets

Related U.S. Application Data

(60) Provisional application No. 62/789,790, filed on Jan. 8, 2019.

(56) References Cited

U.S. PATENT DOCUMENTS

| | | | | |
|---|---|---|---|---|
| 2019/0108614 | A1* | 4/2019 | Grange | H04S 7/303 |
| 2019/0200158 | A1 | 6/2019 | Verbeke | |
| 2021/0067894 | A1 | 3/2021 | Leppanen | |
| 2021/0127224 | A1* | 4/2021 | Laaksonen | H04S 7/304 |

OTHER PUBLICATIONS

Peters, Nils et al., On the application of multiple HOA streams for MPEG-I, Qualcomm Technologies, Audiokinetic, ISO/IEC JTC1/SC29/WG11 MPEG2018/M44875, Oct. 2018, Macau, China (4 pages total).

Nygaard, Troels, Audio Tools and Experiments in UE4, using Wwise: A Spline Based Audio Emitter/Volumetric Audio Emitter for Custom Shapes, Sound Design/Wwise Tips & Tools, Audiokinetic Blog, Aug. 1, 2018 (8 pages total).

Oculus VR, Beyond Surround Sound: Audio Advances in VR, Oculus Blog, Sep. 19, 2017 (7 pages total).

Tylka, Joseph G. et al., Comparison of Techniques for Binaural Navigation of Higher-Order Ambisonic Soundfields, Audio Engineering Society, Convention Paper 9421, 139th Convention, Oct. 29-Nov. 1, 2015, New York, USA (13 pages total).

Volumetric Audio—Documentation, https://assetstore.unity.com/packages/tools/audio/volumetric-audio-17125 (accessed Dec. 3, 2018) (32 pages).

* cited by examiner

SPATIALLY-BOUNDED AUDIO ELEMENTS WITH INTERIOR AND EXTERIOR REPRESENTATIONS

CROSS-REFERENCE TO RELATED APPLICATIONS

This application is a continuation of U.S. application Ser. No. 17/421,673, filed on 2021 Jul. 8 (now U.S. Pat. No. 11,930,351, issued on 2024 Mar. 12), which is a 35 U.S.C. § 371 National Stage of International Patent Application No. PCT/EP2019/086876, filed 2019 Dec. 20, which claims priority to U.S. provisional application No. 62/789,790, filed on 2019 Jan. 8. The above-identified applications are incorporated by this reference.

TECHNICAL FIELD

Disclosed are embodiments related to spatially-bounded audio elements.

BACKGROUND

A listener's perception of sound is influenced by spatial awareness; for example, a listener may be able to determine the direction that a sound wave is coming from. Based in part on determining the direction that a sound wave is coming from, a listener may also be able to separate several simultaneous sound waves. A listener (a.k.a. observer) receives signals picked up by the listener's two ear drums, a left-ear signal and a right-ear signal. From these two signals, the listener deduces spatial information. When attempting to create a realistic virtual 3D audio environment, therefore, it is useful to simulate left- and right-ear signals that the listener would hear in the virtual environment, and then to deliver such signals to the listener's left and right ears. This can enhance the effect of a virtual environment.

Spatial audio rendering in a virtual environment is the process that ultimately delivers the output audio signals that result in left- and right-ear signals of a physical listener experiencing the virtual environment that are consistent with the left- and right-ear signals for a virtual listener at a certain position and orientation in that environment. The delivery of these signals can be e.g. through external loudspeakers or headphones. In the case of headphone delivery, the renderer typically generates the left- and right-ear signals directly, as they are delivered directly to the left and right ears of the physical listener by the headphones. In the case of loudspeaker delivery, the renderer aims to generate the loudspeaker signals for the loudspeaker configuration used for the delivery in such a way that the combination of the soundwaves from the loudspeakers at the physical listener's ears will be the intended left- and right-ear signals. The ultimate goal of the rendering process is that the spatial audio perceived by the physical listener agrees well with the spatial audio representation provided to the renderer.

Most known platforms and standards for the production, transmission, and rendering of immersive spatial audio support one or more of three main formats for spatial audio scene representation: Channel-based audio scene representation; Object-based audio scene representation; and Higher-order ambisonics (HOA) audio scene representation.

Virtual reality (VR), augmented reality (AR), and mixed reality (MR) systems that include immersive audio typically support combinations of two (or in some cases all three) of these representation formats. Depending on the characteristics of the scene to be rendered and on the capabilities of the system, one representation format may be more suitable than the other. By their definition, the channel-based and HOA formats are used to describe the spatial sound field at (and to some extent around) a defined listening position within some (real or virtual) listening space. In other words, the channel-based and HOA formats are listener-centric.

In the VR, AR, and MR contexts, HOA is attractive because it is very suitable for representing highly complex immersive scenes in a relatively compact and scalable way, and because it enables easy rotation of the rendered sound field in response to changes in the listener's head orientation. The latter property of HOA is particularly attractive for VR, AR, and MR applications where the audio is delivered to the listener through headphones with head tracking.

Object-based audio scene representations, unlike these listener-centric representations, describe sound sources emitting sound waves into the environment and their properties. In its simplest form, a sound source is an omnidirectional point source with a position and orientation in space that emits the sound waves evenly in all directions. A point source can also be directional, in which case it radiates the sound waves unevenly in different directions and the directivity of that radiation will need to be specified. Another more complicated audio source is a surface source that emits sound waves from a 2- or 3-dimensional surface into its surroundings. This source will also have a position, orientation, and an uneven radiation pattern if it is directional. In other words, object-based audio scene representations are source-centric. This makes this format very suitable for representing interactive VR, AR, and MR audio scenes in which the relative positions of sources and the listener may be changed interactively (e.g. through user actions).

SUMMARY

Although the channel-based, object-based, and HOA representation formats are very powerful tools for creating and delivering immersive interactive audio scenes, use cases are envisioned in the VR context for which these formats, in their present form, are not sufficient. Specifically, such use cases may include audio elements that have both an interior and exterior space, where a listener might move from the audio element's interior to its exterior and vice versa, and where a different audio experience is expected depending on whether the listener is located inside or outside the audio element.

Such audio elements might take the form of a spatially-bounded space or "environment" that the listener may move into and out from. Some examples include a busy town square in a virtual city, a football stadium, and a forest. As should be clear from these examples, the spatial boundary of the audio element does not need to be a "hard" boundary but can be a "soft" boundary that is more conceptually (and perhaps somewhat more arbitrarily) defined. Alternatively, the audio elements might take the form of a more clearly defined spatially extensive "object" or entity that the listener may step into and out from, e.g. a fountain, a crowd of people, a music ensemble (e.g. a choir or orchestra), and an applauding audience in a concert hall. Here, the definition of the spatial boundary of the audio element may be rather "hard" (if the audio element is an actual object, like the fountain example) or "soft" (if the audio element represents a more conceptual entity, like the crowd example).

In many VR use cases, it would be desirable for the listener to be able to freely move between the interior and exterior of the type of audio elements described above, with a spatially meaningful audio experience in both situations. To be spatially meaningful here means, at least in part, that the listener perceives the sound realistically and/or that there is a gradual transition (e.g., smooth transition) when moving between the interior and exterior of the audio element.

Some prior work has attempted to address the problem of making a smooth transition from one listener-centric acoustical representation to another, where the sound fields of the two spaces are basically independent from each other. Others have looked at ways to render ambient sound inside area shapes that fades out as you move further away from the specified area. For example, one such approach has two states, the Outside State and Inside State. In the Outside State it renders the sound as a stereo sound where distance attenuation is applied based on the closest distance from the listener to the bounding area surface. In the Inside State the location of the emitted stereo sound is set to follow the listener and the listener orientation. In some prior work, the problem of rendering a surface source that emits sound waves from a 2- or 3-dimensional surface into its surroundings (also known as a volumetric sound source) has been addressed. Some of these prior works also describe some rudimentary attempts to render the sound inside such surfaces. The methods used to do that have not been described in any detail, but the authors claim that once you step inside the volume, you hear the sound all around you.

One problem that embodiments described herein address deals with targeting an audio element with a listener-centric internal representation and ways to render that audio element to listening positions both inside and outside of the volume encapsulating the element, in a spatially consistent and meaningful way.

The prior work described above does not target the same problem and has clear shortcomings if one would attempt to apply that work to this specific problem. Some of these shortcomings are described below.

The first approach described above (delivering a gradual fade between two listener-centric representations) does not render either listener-centric audio element in a spatially consistent and meaningful way at listening positions outside of the respective volume encapsulating each element. It is in fact rendering them with substantial spatial distortions. In the specific case of an internal representation in HOA format, the typical rendering on a configuration of (virtual) loudspeakers only leads to a meaningful result within the interior of that loudspeaker configuration. A "naïve" scenario for external rendering of an internal HOA representation could be to just render the HOA representation on the virtual loudspeaker configuration intended for the internal rendering, and then expect those same loudspeaker signals to also provide a meaningful spatial result at listening positions outside this loudspeaker configuration. However, this will typically not work because the loudspeaker signals may contain very specific relationships (such as antiphase components) that combine in the intended way only at the internal center of the loudspeaker configuration (or at positions close to this). At positions outside the loudspeaker configuration, the signals combine in an uncontrolled and typically undesirable way, leading to a highly distorted spatial image that has little relation to the desired one.

In the second approach described above (ambient sound inside area shapes that fades out as you move further away from the specified area), the only difference between the inside and outside rendering appears to be that outside distance attenuation is applied, while inside there is only a basic panning depending on listener orientation.

The final approaches described above (rendering a surface source that emits sound waves from a 2- or 3-dimensional surface into its surroundings) only describe very rudimentary rendering implementations of the volumetric sound sources inside the bounding volume, with no intent to do any rendering in a spatially consistent and meaningful way. As implemented it appears to use a simple mono signal.

Accordingly, the embodiments herein provided are useful to overcome some or all of these problems, and to provide other benefits.

In embodiments, a spatial audio element is represented by a set of signals describing the "interior" sound field of the audio element in a listener-centric way, and also by associated metadata that indicates a spatial region within which the listener-centric interior representation is valid. For (virtual) listening positions outside the defined spatial region, a different, "exterior" representation of the spatial sound field of the same audio element is used for rendering, thus creating a distinctly different audio experience depending on whether the listener is (virtually) located inside or outside of the audio element. The exterior representation may be derived from the interior representation, in such a way that a spatially consistent and meaningful relationship between the two representations is maintained. Where the interior sound field may be in a listener-centric representation, in some embodiments the exterior representation may be object-based.

Some advantages of embodiments provided herein include that some embodiments are more efficient (e.g., in size of transmission and/or rendering time) than providing independent internal and external representations. In embodiments where the exterior representation is derived from the interior representation, dynamic changes in the interior representation are directly reflected in the resulting exterior representation. Embodiments also exhibit lower computational complexity compared to physical sound propagation modeling techniques, e.g. enabling implementations in a low-complexity/low-latency environment (such as mobile VR applications).

According to a first aspect, a method of providing a spatially-bounded audio element is provided. The method includes providing, to a rendering node, an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region.

In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, a difference between the internal representation and external representation is small, such that there is a gradual transition (e.g., smooth transition) between the internal representation and external representation.

According to a second aspect, a method of audio rendering (e.g., rendering a spatially-bounded audio element) is provided. The method includes receiving an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The method further includes determining that a listener is within the spatial region; and rendering the audio element by using the interior representation of the audio element.

In some embodiments, the method further includes detecting that the listener has moved outside the spatial region; deriving the exterior representation of the audio element (e.g., optionally based on the information indicating how the exterior representation is to be derived); and rendering the audio element by using the exterior representation of the audio element. In embodiments, the method further includes determining that the listener is within a first distance from the spatial region; determining that the first distance is less than a transition threshold value; and as a result of determining that the first distance is less than a transition threshold value, transitioning gradually (e.g., cross-fading) between the exterior representation and the interior representation based on the first distance In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, there is a gradual transition (e.g., smooth transition) between the internal representation and external representation. In embodiments, deriving the exterior representation of the audio element is further based on one or more of a position and an orientation of the listener.

According to a third aspect, a method of audio rendering (e.g., rendering a spatially-bounded audio element) is provided. The method includes receiving an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The method further includes determining that a listener is outside the spatial region; deriving the exterior representation of the audio element (e.g. optionally based on the information indicating how the exterior representation is to be derived); and rendering the audio element by using the exterior representation of the audio element.

In some embodiments the exterior representation of the audio element is derived from the interior representation. In embodiments, the method further includes detecting that the listener has moved within the spatial region; and rendering the audio element by using the interior representation of the audio element. In embodiments, the method further includes determining that the listener is within a first distance from the spatial region; determining that the first distance is less than a transition threshold value; and as a result of determining that the first distance is less than a transition threshold value, transitioning gradually (e.g., cross-fading) between the interior representation and the exterior representation based on the first distance.

In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, there is a gradual transition (e.g., smooth transition) between the internal representation and external representation. In embodiments, deriving the exterior representation of the audio element is further based on one or more of a position and an orientation of the listener.

According to a fourth aspect, a node (e.g., a decoder) for providing a spatially-bounded audio element is provided. The node is adapted to provide, to a rendering node, an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region.

According to a fifth aspect, a node (e.g., a rendering node) for audio rendering is provided. The node is adapted to receive an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The node is further adapted to determine whether a listener is within the spatial region or outside the spatial region. The node is further adapted to, if the listener is within the spatial region, render the audio element by using the interior representation of the audio element. Otherwise, if the listener is outside the spatial region, the node is further adapted to derive the exterior representation of the audio element (e.g. optionally based on the information indicating how the exterior representation is to be derived); and render the audio element by using the exterior representation of the audio element.

According to a sixth embodiment, a node (e.g., a decoder) for providing a spatially-bounded audio element is provided. The node includes a providing unit configured to provide, to a rendering node, an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region.

According to a seventh embodiment, a node (e.g., a rendering node) for audio rendering is provided. The node includes a receiving unit configured to receive an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The node further includes a determining unit configured to determine whether a listener is within the spatial region or outside the spatial region; and a rendering unit and a deriving unit. If the determining unit determines that the listener is within the spatial region, the rendering unit is configured to render the audio element by using the interior representation of the audio element. Otherwise, if the determining unit determines that the listener is outside the spatial region, the deriving unit is configured to derive the exterior representation of the audio element (e.g. optionally based on the information indicating how the exterior representation is to be derived); and the rendering unit is configured to render the audio element by using the exterior representation of the audio element.

According to an eighth aspect, a computer program comprising instructions which when executed by processing circuitry of a node causes the node to perform the method of any one of the first, second, and third aspects is provided.

According to a ninth aspect, a carrier containing the computer program of any embodiment of the eighth aspect is provided, where the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
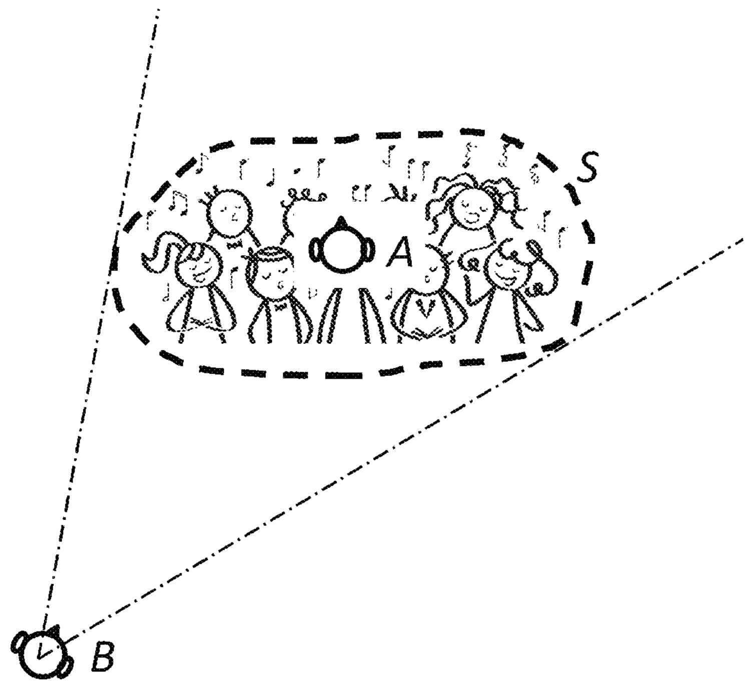
FIG. 1 illustrates an example of a spatially bounded audio environment, according to an embodiment.

FIG. 1 illustrates an example of a spatially bounded audio environment. As shown in this example, an audio element (here, a choir), is positioned somewhere in a virtual space of a VR, AR, or MR scene. It is assumed that the choir audio element is represented by a spatial audio recording of the choir that was made with some suitable spatial recording setup, e.g. a spherical microphone array that was placed at a central position within the choir during a live performance. This recording may be considered an "interior" listener-centric representation of the choir audio element. Although in reality the choir includes multiple individual sound sources, it can conceptually be considered a single audio element that is enclosed by some notional boundary S, indicated by the dashed line in FIG. 1. In a description of the virtual scene that is transmitted to the user's device, e.g. in the form of a scene graph, the choir may indeed be described as a single audio element within the scene, with some associated properties in metadata that include some specification of the notional boundary S.

In this example, it is assumed that the user is free to choose a listening position within the virtual space. Two such positions are labeled in FIG. 1, position A and position B. First, consider the case where the user has selected a listening position A that is within the boundary S of the audio element (the choir). At this listening position, the user is (virtually) surrounded by the choir, and so a corresponding surrounding listening experience will be expected. The available listener-centric representation of the choir, resulting from a spatial recording from within the choir, is very suitable for delivering such a desired listening experience, and so it is used for rendering the audio element to the user (e.g. using binaural headphone rendering including processing of head rotations). This will also be the case for other listening positions within the notional boundary S, which are all considered to be "internal" listening positions for the audio element.

Now, the user changes listening positions from position A to position B, which is located outside the notional boundary S. Thus, this may be considered an "exterior" listening position for the audio element. At this exterior listening position, the expected audio experience will be very different. Instead of being surrounded by the choir, the user will now expect to hear the choir as an acoustic entity located at some distant position within the space, more like an audio object. However, depending on the distance of the user to the audio element, the expected audio experience of the choir will still be a spatial one, i.e. with a certain natural variation within the virtual area it occupies. More generally, it can be stated that the expected audio experience will depend on the user's specific listening position relative to the audio element.

The problem that now arises is that the available listener-centric "interior" representation of the audio element is not directly suitable for delivering this expected audio experience to the listener, as it represents the perspective of a listener positioned in the center of the choir. What is needed is an "exterior" representation of the audio element that is more representative for the expected listening experience at the specific "exterior" listening position. In embodiments, this required exterior representation is derived from the available listener-centric "interior" representation by transforming it in a suitable way, for example through a downmixing or mapping processing step. Specific embodiments for the transformation processing are described below. In embodiments, such a transformation results in an object-based representation of the sound field.

The exterior representation of the choir audio element that is derived from the interior representation is now used for rendering its sound to the user, resulting in a listening experience that corresponds with the selected listening position, similarly to what is done with the source-centric representation of ordinary audio objects.

Having sketched the concept by means of the simplified example above, various embodiments, variations and optional features for implementing the general concept in detail are now described.

Interior Representation and Rendering.

In one embodiment, the audio element is represented by a listener-centric interior audio representation (e.g., one or more of a channel-based and HOA formats) and associated metadata that specifies the spatial region within which the interior representation is valid. Spatial region is used here in a broad sense, and is not limited to a closed region; it may include multiple closed regions, and may also include unbounded regions. In other words, the metadata defines the range or ranges of user positions for which the interior audio representation of the audio element should be used. In some embodiments, the spatial region may be defined by a spatial boundary, such that positions on one side of the boundary are deemed in the spatial region and other positions are deemed outside the spatial region.

In one embodiment, the listener-centric interior representation is a representation in a HOA format. The spatial region in which the "interior" representation is valid may be defined relative to a reference point within the audio element (e.g. its center point), or relative to the frame of reference of the audio scene, or in some other way. The spatial region may be defined in any suitable way, e.g. by a radius around some reference position (such as the geometric center of the audio element), or more generally as a trajectory or a set of connected points in 3D space specifying the spatial boundary such as a meshed 3D surface. In general, the renderer should have access to a procedure to determine whether or not a given position is within or outside of the spatial region. In some embodiments, such a procedure will be computationally simple.

For user positions inside the spatial region of the audio element (as specified by the metadata), the rendering may be homogenous, meaning that the rendering of the interior representation (e.g. a set of HOA signals) is the same for any user position within the defined spatial region. This is an attractively efficient solution in some circumstances, especially in cases where the interior representation mainly functions as "background" or "atmosphere" audio or has a spatially diffuse character. Examples of such cases are: a forest, where a single HOA signal may describe the forest background sound (birds, rushing leaves) for any user position within the defined spatial boundaries of the forest; a busy café; and a busy town square. Note that although the rendering is the same for any user position within the region, the audio experience is still an immersive one in every position.

In some embodiments, user head rotations are advantageously taken into account. That is, rotation of the rendered (HOA) sound field may be applied in response to changes in the user's head orientation. This may significantly enhance user immersion at the cost of only a slight increase in rendering complexity.

In cases where there are individual sound sources in the scene whose spatial locations and/or balance should remain consistent with user movement, the rendering inside the audio element may be adapted to explicitly reflect the user movement and the resulting changes in relative positions and levels of audio sources. Examples of this include: a room with a TV in one corner and a circular fountain. Here, the rendering of the interior representation is not homogeneous as above, but is adapted in dependence of the virtual listening position. It is possible to adapt rendering based on virtual listening position. For example, various techniques are known for the case of an interior representation in HOA format (e.g., HOA rendering on a virtual loudspeaker configuration, plane wave expansion and translation, and re-expansion of the HOA sound field).

Note from the above that the spatial region within which the listener-centric interior sound field representation is valid is defined from a high-level scene description perspective. That is, it can be considered an artistic choice made by the content creator. It can be completely independent from any intrinsic region of validity of the interior audio representation itself (e.g. a physical region of validity of the HOA signal set).

Transforming the Interior Representation to the Exterior Representation

The "exterior" representation may be derived from the listener-centric "interior" representation, e.g. by downmixing or otherwise transforming the "interior" spatial representation according to rules. These rules might be specified explicitly in metadata. The downmixing or transforming may take into account the position and orientation of the listener, and may depend on the specific listening position relative to the audio element and/or on the user's head rotation in all three degrees of freedom (pitch, yaw and roll).

The exterior representation may take the form of a spatially localized audio object. More specifically, in some embodiments it may take the form of a spatially-heterogeneous stereo audio object e.g. such as described in a co-filed application.

A detailed description of an example implementation with ambisonics (first-order ambisonics (FOA) or HOA) as the listener-centric internal representation and a stereo downmix external representation is now provided.

As described earlier, the exterior representation can be derived from the listener-centric internal representation by capturing a downmix of the internal representation. As one example, this can be achieved by positioning a number of virtual microphones at some point. For the case where the internal representation is in the form of an ambisonics signal, the central point of the ambisonics representation is generally the point with the best spatial resolution and therefore the preferred point to place the virtual microphones. The number of virtual microphones used may vary, but for providing a stereo downmix, at least two microphones are needed.

Figure 2:
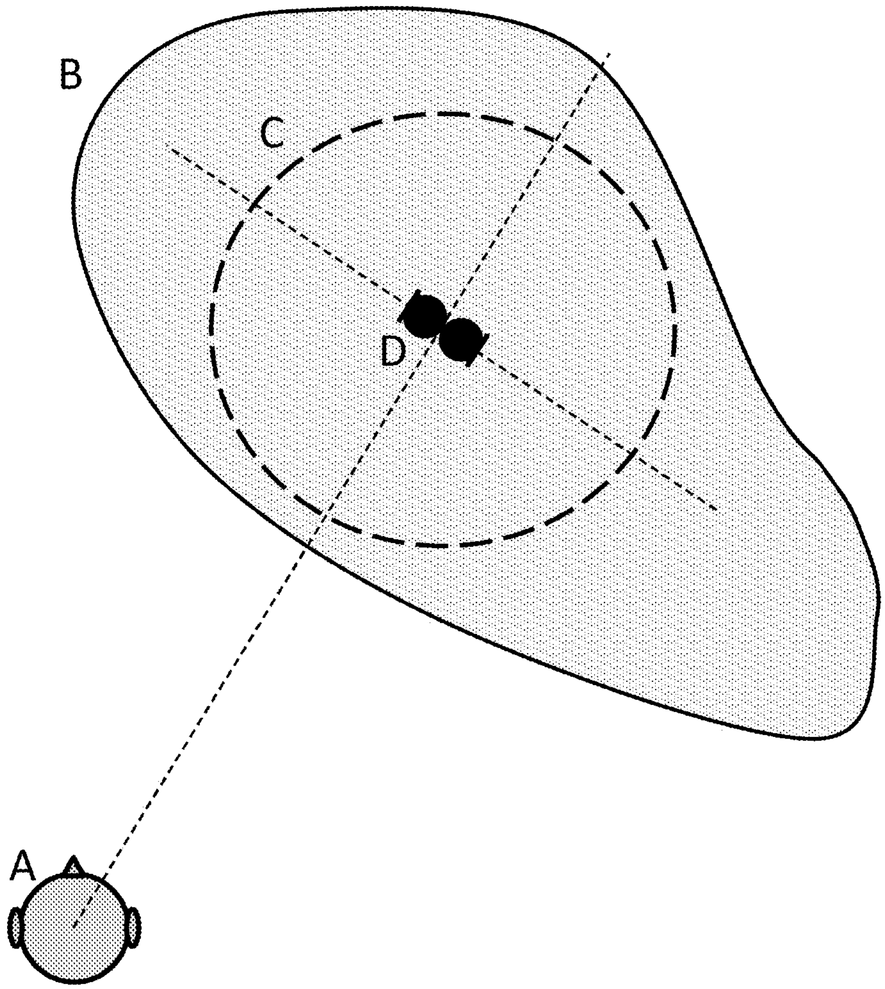
FIG. 2 illustrates an example of two virtual microphones being used to capture a stereo downmix of an ambisonics sound field, according to an embodiment.

FIG. 2 illustrates an example of two virtual microphones being used to capture a stereo downmix of an ambisonics sound field, according to an embodiment. As shown, two virtual microphones labeled D are positioned within the center of an ambisonics sound field labeled C that represents an audio element labeled B. The microphones are depicted with a small distance between them for illustrative purposes, but may be positioned at the same point. The orientation of the microphones is defined relative to the line between the listener position (labeled A) and the center of the audio element, so that the directional properties of the listener-centric internal representation are preserved in the external representation. In order to capture a wide stereo picture, two virtual cardioid microphones can be positioned in the central point of the ambisonics object and can be angled +90 and −90 degrees relative to the mentioned line.

For a first-order ambisonics internal representation, each virtual microphone signal can then be calculated as:

$$m(\theta,\ p) = p\sqrt{2}\,w + (1-p)(\cos(\theta)x + \sin(\theta)y), \tag{1}$$

where w, x, and y are the first-order HOA signals, θ denotes the horizontal angle of the microphone in the ambisonics coordinate system, and p is a number in the range [0, 1] that describes the polar pattern of the microphone. For a cardioid pattern, 0.5 should be used.

More virtual microphones (e.g., more than the two shown in FIG. 2) with other orientations can be used to provide a more even mix of the whole internal sound field, but that would mean some extra calculations and also that the stereo width of the downmix gets slightly narrower. The signals from the microphones are combined to form a stereo downmix. In the simplest case of only two microphones, the signal from the respective microphones can be used directly as the left and right signals. Other microphone orientations (e.g., other than the +90 and −90 degrees used in the above example) may be used, in which case equation (1) is modified accordingly.

As described earlier, the rotation of the user's head may be taken into account in making the downmix. For example, the direction of the virtual microphones can be adapted to the current head pose of the listener so that the microphones' angles follow the head roll of the listener. E.g. if the user keeps his head turned (rolled) 90 degrees, the microphones could be rotated that way and capture the height information instead of the width. Equation (1), in that case, has to be generalized to also include the vertical directions of the virtual microphones.

Figure 3:
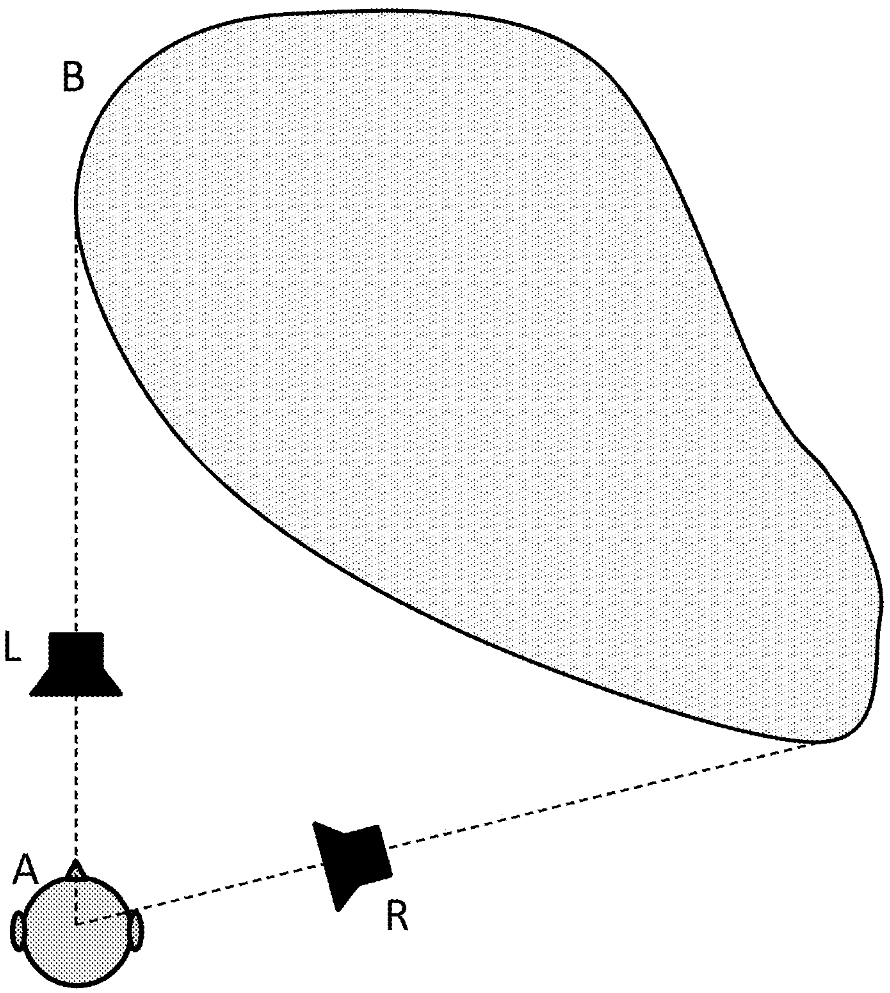
FIG. 3 illustrates an example of how two virtual speakers are used for rendering the external representation of an audio element to a listener, according to an embodiment.

As mentioned above, the external representation and its rendering can be according to the concept of spatially-heterogeneous audio elements, where the stereo downmix is rendered as an audio element with a certain spatial position and extent. In the most straightforward implementation, the stereo signal would then be rendered via two virtual loudspeakers whose positions are updated dynamically in order to provide the listener with a spatial sound that corresponds to the actual position and size of the element that the audio is representing. FIG. 3 illustrates an example of this, i.e. how two virtual speakers (L and R) are used for rendering the external representation of audio element B to a listener at location A.

As an alternative to using two coincident directional virtual microphones as described above, a similar effect can be derived by downmixing to two spaced virtual microphones, preferably spaced omnidirectional virtual microphones. These are then placed at symmetrical positions on the line perpendicular to the line between the listener and the center point, spaced e.g. 20 cm apart. The downmix signals for these virtual microphones may be calculated by rendering the ambisonics signal to a virtual loudspeaker configuration surrounding the virtual microphone setup, and then summing the contributions of all virtual loudspeakers for each microphone. The summing may take into account both the time and level differences resulting from the different virtual loudspeakers. An advantage of this method is that the omnidirectional microphones have no "preference" for specific source directions within the internal spatial area, so all sources within the area are treated equally.

In addition to the ambisonics dowmixing methods described in detail above, other similar methods can be used. One example is the ambisonic UHJ format.

Special care needs to be taken during the transition between the internal representation (which in the embodiment described above is some variant of ambisonic rendering), and the external representation, so that the transition is smooth and natural. One way to do this is to run both internal and external rendering in parallel during the transition and smoothly cross-fade from one to the other within a certain transition zone. For example, the transition zone may be defined e.g. as any point within a threshold distance from the spatial boundary, or the transition zone may be defined as a region independent of any reference to the spatial region. The downside to this method is the extra processing of running two rendering methods in parallel.

The cross-fade technique depends on the direction that the user is moving. For example, if the user begins in a position within the spatial region and then begins moving toward the boundary and eventually out of the spatial region, then the internal representation can be faded out and the external representation faded in, as the user completes this movement. On the other hand, if the user begins in a position outside of the spatial region and then begins moving toward the boundary and eventually within the spatial region, then the external representation can be faded out and the internal representation faded in.

Generalization to Other (Non-Ambisonics) Listener-Centric Internal Representations.

In the description above, embodiments are provided for audio elements for which the interior sound field is represented by a set of HOA signals. However, not all embodiments are limited to HOA signals, and the techniques described may also be applied for audio elements that have an interior sound field representation in other listener-centric formats, e.g. (i) a channel-based surround format like 5.1, (ii) a Vector-Base Amplitude Planning (VBAP) format, (iii) a Directional Audio Coding (DirAC) format, or (iv) some other listener-centric spatial sound field representation format.

Regardless of the format for the interior-representation, embodiments provide for transforming the listener-centric interior representation that is valid inside the spatial region to an external representation that is valid outside the spatial region, e.g. by downmixing to a virtual microphone setup as described above for the HOA case, and then rendering the relevant representation to the user depending on whether the user's listening position is inside or outside to the spatial region.

For example, channel-based internal representations are listener-centric representations that, as such, are essentially meaningless at external listening positions (e.g. similar to the situation for HOA representations already explained). Therefore, the channel-based internal representation needs to be transformed into a more meaningful representation before rendering to external listening positions. For channel-based internal representations, as described for the HOA case, virtual microphones can be used to downmix the signal to derive the external representation.

In embodiments, there is a smooth or gradual change from the internal representation to the external representation (or vice versa) when the user crosses the boundary of the spatial region. Metadata may be included with the audio element that specifies the transition region (e.g. to support cross-fading), and the metadata may also indicate what algorithm to be used for deriving the external representation. The rules for transforming the listener-centric interior representation to the exterior representation may be explicitly included in the metadata that is transmitted with the audio element (e.g. in the form of a downmix matrix), or they may be specified independently in the renderer. In the latter case, some metadata may still be transmitted with the audio element to control specific aspects of the transformation process in the renderer, such as any of the aspects described above; also, in embodiments, metadata may indicate to the renderer that it is to use its own transformation rules to derive the exterior representation. The specification of the full transformation rules may be distributed along the signal chain between content creator and renderer in any suitable way.

Alternatively, instead of the exterior representation being derived from the interior representation, the exterior representation may in some embodiments be provided explicitly, e.g. as a stereo or multi-channel audio signal, or as another HOA signal. An advantage of this embodiment is that it would be easy to integrate into various existing standards, requiring only small additions or modifications to the existing grouping mechanisms of these standards. For example, integrating this embodiment into the existing MPEG-H grouping mechanism would merely require an extension of the existing grouping structure in the form of the addition of a new type of group (combining e.g. an HOA signal set and a corresponding stereo signal) plus some additional metadata (including at least the description of the spatial region, plus optionally any of the other types of metadata described herein). A disadvantage of this embodiment, however, is that there is no implicit spatial consistency between the interior and exterior representations. This could be a problem if the spatial properties of the audio element are changing over time due to user-side interaction. In cases where there is no such interaction, the spatial relationship between the two representations can be handled at the content-production side.

Figure 4:
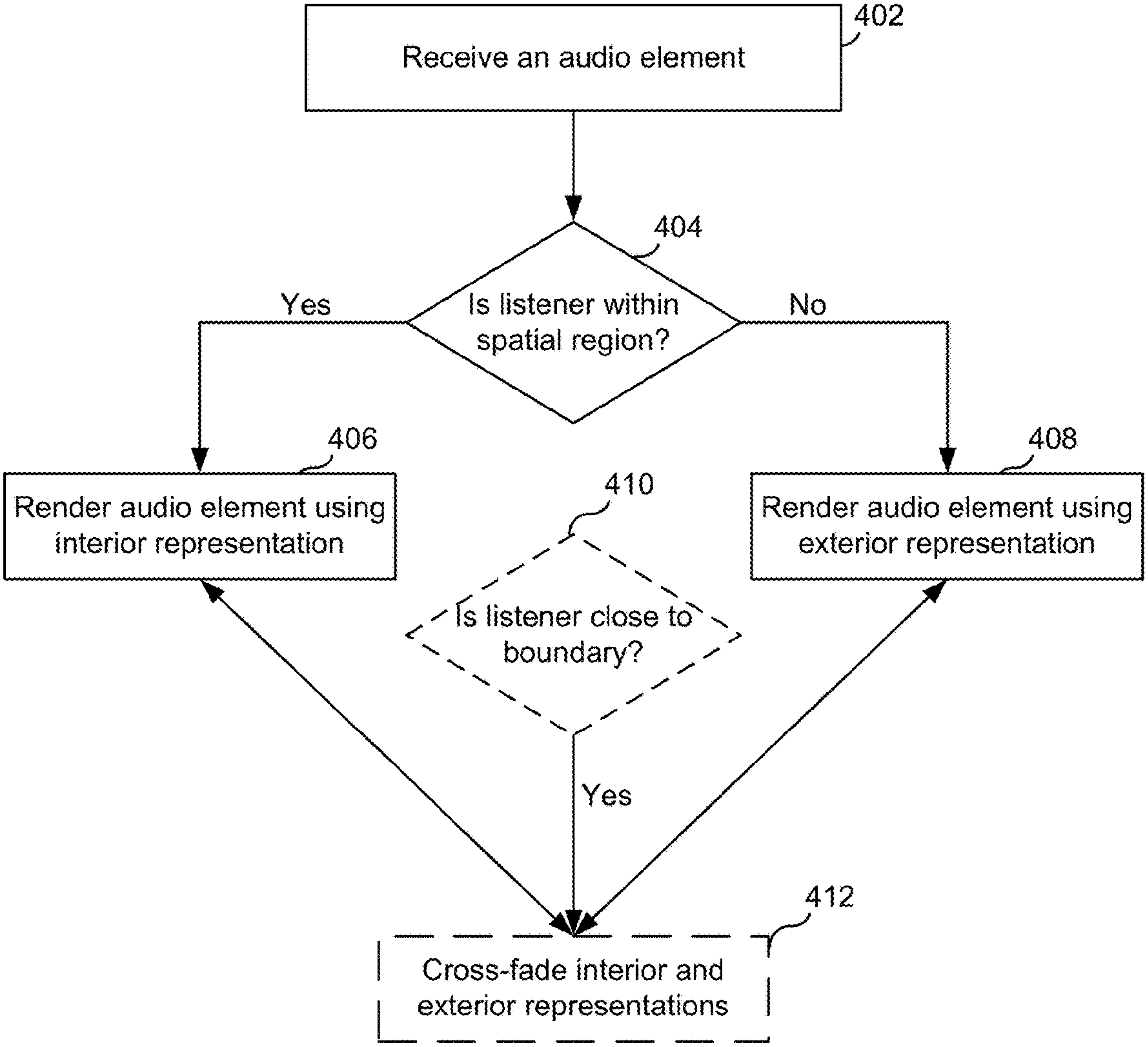
FIG. 4 is a flow chart illustrating a process according to an embodiment.

FIG. 4 is a flow chart illustrating a process according to an embodiment. In step 402, a rendering node may receive an audio element, such as described in various embodiments disclosed herein. The audio element may contain an interior representation and metadata indicating a spatial region for which the interior representation is valid, as well as information indicating how to derive an exterior information. A test is performed to determine whether a listener is within the spatial region at step 404. If so, the audio is rendered using the interior representation at 406. If not, the audio is rendered using the exterior representation at 408. The exterior representation may first be derived e.g. from the interior representation, as necessary. In some embodiments, in order to provide for a smoother transition between the exterior and interior of the spatial region, for a listener that is moving, a test may be performed to determine whether a listener is close to a boundary of the spatial region at step 410. For example, if the user is within a small distance δ from the boundary, the listener may be considered close to the boundary. This small distance δ may be specified in the metadata, or otherwise known to the rendering node, and may be an adjustable setting. If the listener is close to the boundary, then the interior and exterior representations may be rendered simultaneously and cross-faded with each other at step 412. The cross-fading may take into account one or more of a distance the listener is from the boundary, which side of the boundary the listener is on (interior or exterior), and a velocity vector of the listener.

Figure 5:
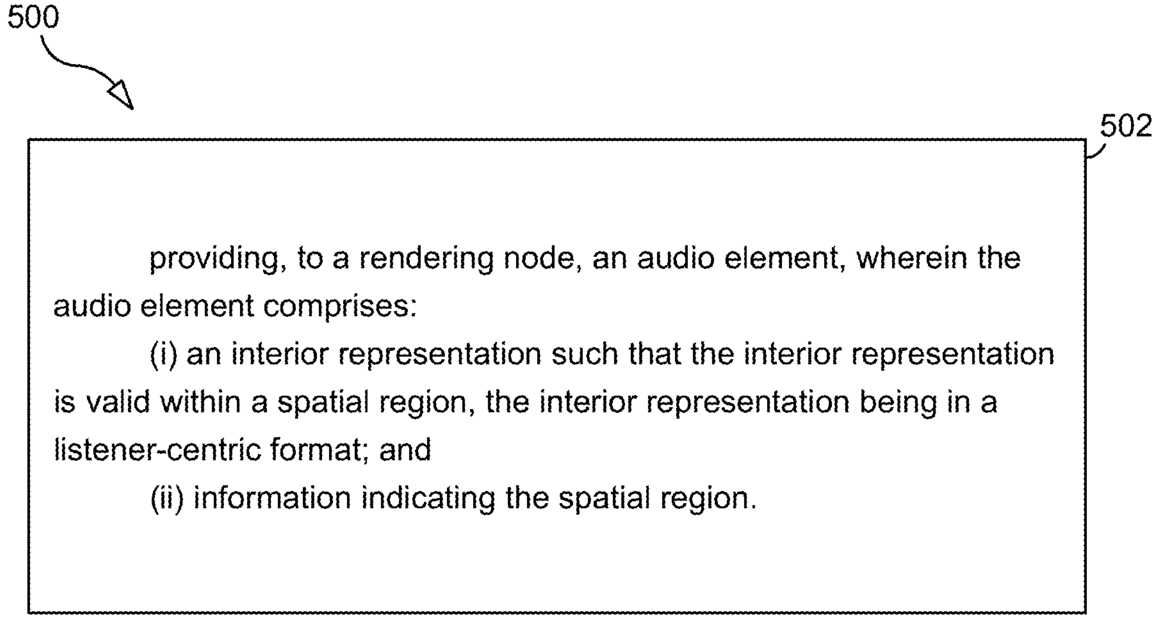
FIG. 5 is a flow chart illustrating a process according to an embodiment.

FIG. 5 is a flow chart illustrating a process 500 according to an embodiment. Process 500 is a method of providing an audio element (e.g., a spatially-bounded audio element). The method includes providing, to a rendering node, an audio element (step 502). The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region.

In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, there is a gradual (e.g., smooth) transition between the internal representation and external representation.

Figure 6:
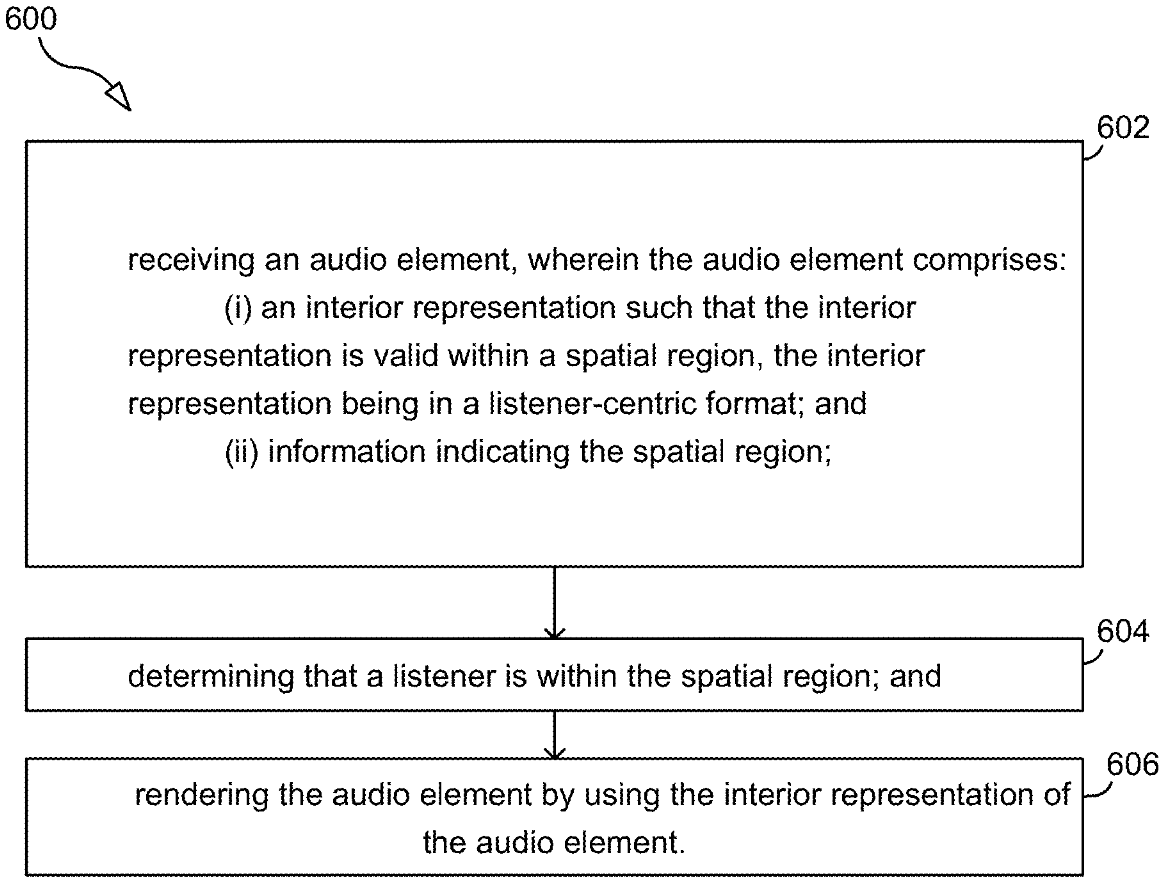
FIG. 6 is a flow chart illustrating a process according to an embodiment.

FIG. 6 is a flow chart illustrating a process according to an embodiment. Process 600 is a method of audio rendering (e.g., a method of rendering a spatially-bounded audio element). The method includes receiving an audio element (step 602). The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The method further includes determining that a listener is within the spatial region (step 604); and rendering the audio element by using the interior representation of the audio element (step 606).

In some embodiments, the method further includes detecting that the listener has moved outside the spatial region; deriving the exterior representation of the audio element (e.g. optionally based on the information indicating how the exterior representation is to be derived); and rendering the audio element by using the exterior representation of the audio element. In embodiments, the method further includes determining that the listener is within a first distance from the spatial region; determining that the first distance is less than a transition threshold value; and as a result of determining that the first distance is less than a transition threshold value, transitioning gradually (e.g., cross-fading) between the exterior representation and the interior representation based on the first distance.

In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, there is a gradual (e.g., smooth) transition between the internal representation and external representation. In embodiments, deriving the exterior representation of the audio element is further based on one or more of a position and an orientation of the listener.

Figure 7:
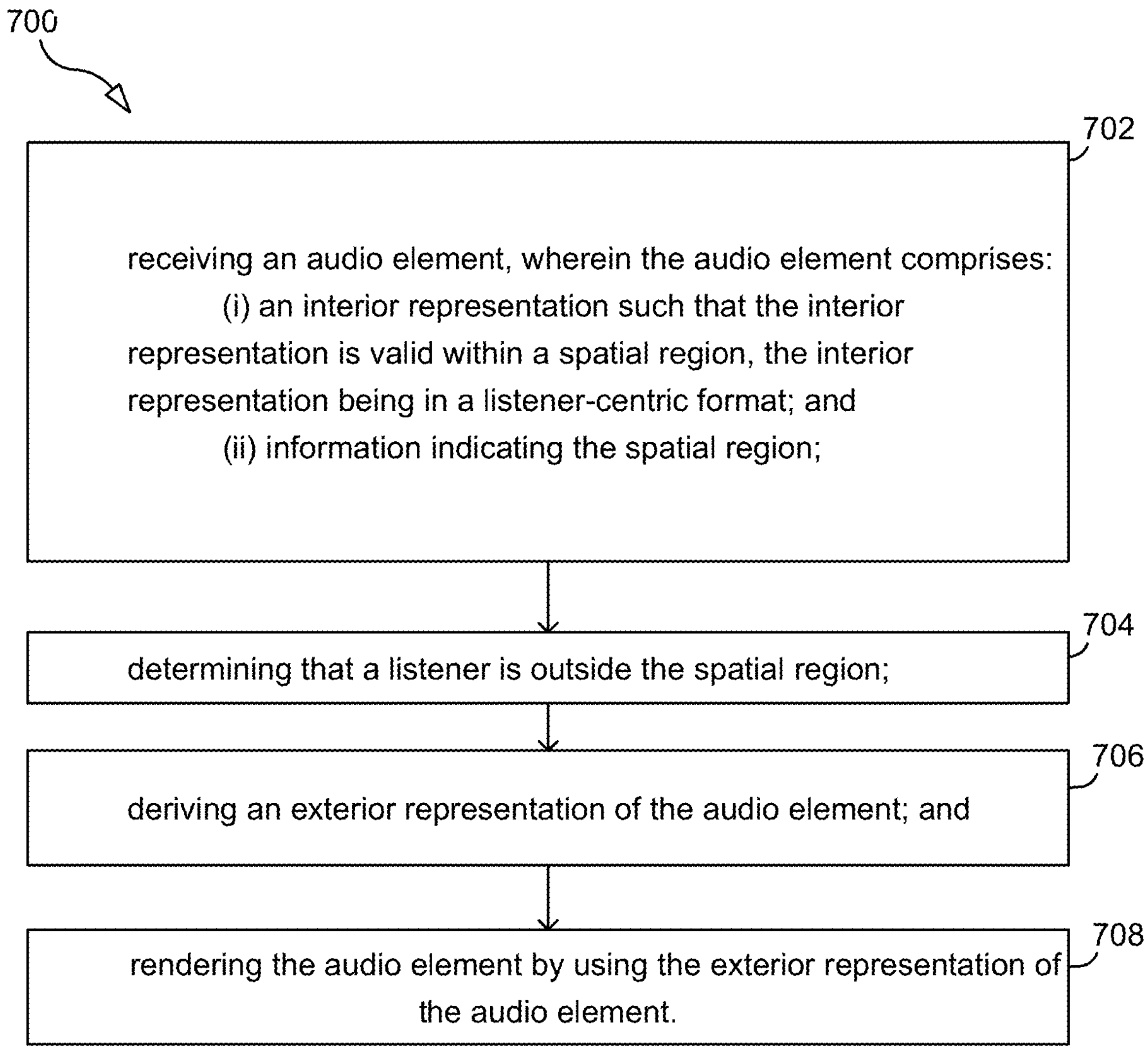
FIG. 7 is a flow chart illustrating a process according to an embodiment.

FIG. 7 is a flow chart illustrating a process according to an embodiment. Process 700 is a method of audio rendering (e.g. a method of rendering a spatially-bounded audio element). The method includes receiving an audio element (step 702). The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The method further includes determining that a listener is outside the spatial region (step 704); deriving the exterior representation of the audio element (e.g. optionally based on the information indicating how the exterior representation is to be derived) (step 706); and rendering the audio element by using the exterior representation of the audio element (step 708).

In some embodiments, the exterior representation of the audio element is derived from the interior representation. In embodiments, the method further includes detecting that the listener has moved within the spatial region; and rendering the audio element by using the interior representation of the audio element. In embodiments, the method further includes determining that the listener is within a first distance from the spatial region; determining that the first distance is less than a transition threshold value; and as a result of determining that the first distance is less than a transition threshold value, transitioning gradually (e.g., cross-fading) between the interior representation and the exterior representation based on the first distance.

In some embodiments, the information indicating how an exterior representation is to be derived indicates that the exterior representation is to be derived from the interior representation. In embodiments, the information indicating how an exterior representation is to be derived includes a downmix matrix. In embodiments, the information indicating how an exterior representation is to be derived includes a set of signals representing the exterior representation. In embodiments, the interior representation is represented by one or more of (i) a channel-based audio scene representation, and (ii) an ambisonics (HOA) audio scene representation (e.g., a higher order HOA audio scene).

In some embodiments, for points close to a boundary of the spatial region, a difference between the internal representation and external representation is small, such that there is a gradual transition (e.g., smooth transition) between the internal representation and external representation. In embodiments, deriving the exterior representation of the audio element is further based on one or more of a position and an orientation of the listener.

Figure 8:
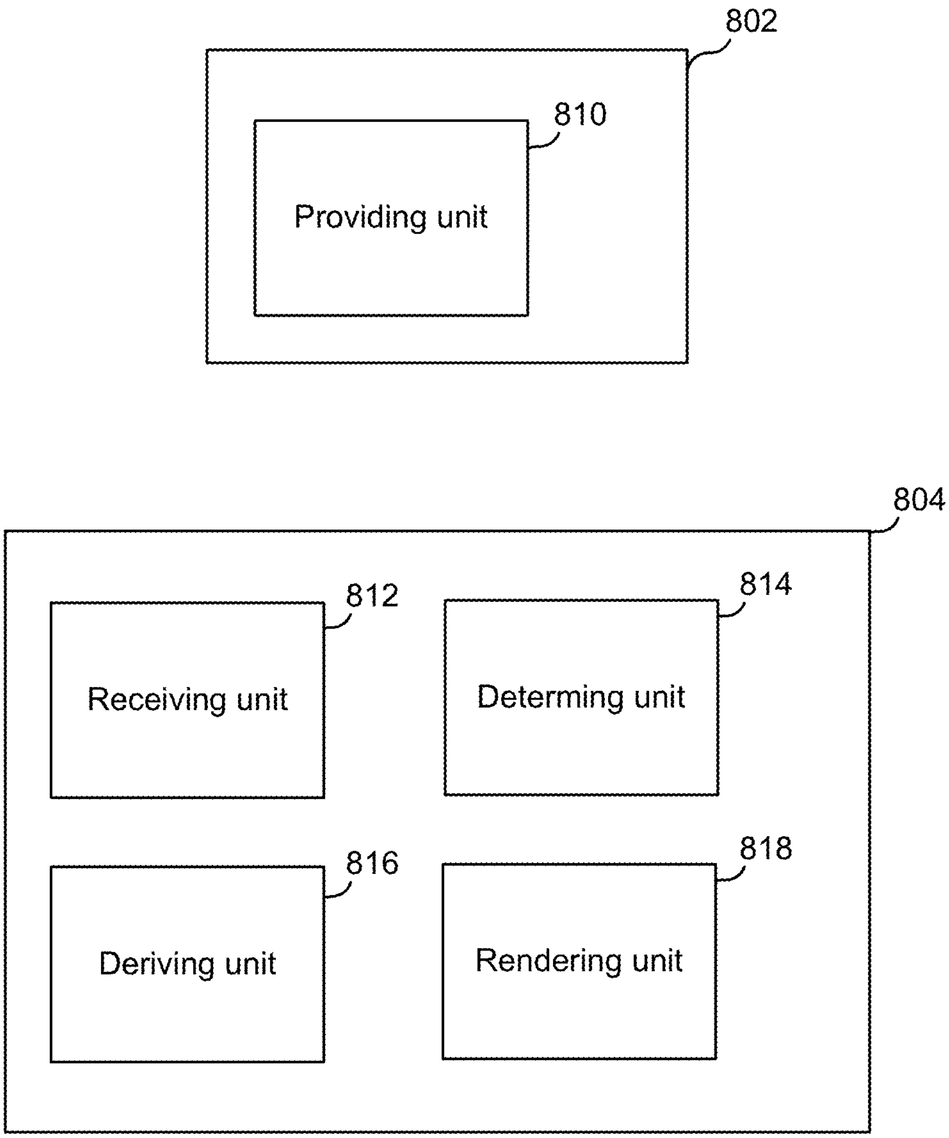
FIG. 8 is a diagram showing functional units of an encoding node and a rendering node, according to embodiments.

FIG. 8 is a diagram showing functional units of an apparatus (a.k.a., node) 802 (e.g., a decoder) and a node 804 (e.g., a rendering node), according to embodiments. Node 802 includes a providing unit 810. Node 804 includes a receiving unit 812, a determining unit 814, a deriving unit 816, and a rendering unit 818.

Node 802 (e.g., a decoder) is configured for providing a spatially-bounded audio element. The node 802 includes a providing unit 810 configured to provide, to a rendering node, an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region.

Node 804 (e.g., a rendering node) is configured for audio rendering (e.g., rendering a spatially-bounded audio element). The node 804 includes a receiving unit 812 configured to receive an audio element. The audio element includes: (i) an interior representation that is valid within a spatial region, the interior representation being in a listener-centric format; (ii) information indicating the spatial region; and optionally (iii) information indicating how an exterior representation is to be derived, such that the exterior representation is valid outside the spatial region. The node 804 further includes a determining unit 814 configured to determine whether a listener is within the spatial region or outside the spatial region; and a rendering unit 818 and a deriving unit 816. If the determining unit 814 determines that the listener is within the spatial region, the rendering unit 818 is configured to render the audio element by using the interior representation of the audio element. Otherwise, if the determining unit 814 determines that the listener is outside the spatial region, the deriving unit 816 is configured to derive the exterior representation of the audio element (e.g. optionally based on the information indicating how the exterior representation is to be derived); and the rendering unit 818 is configured to render the audio element by using the exterior representation of the audio element.

Figure 9:
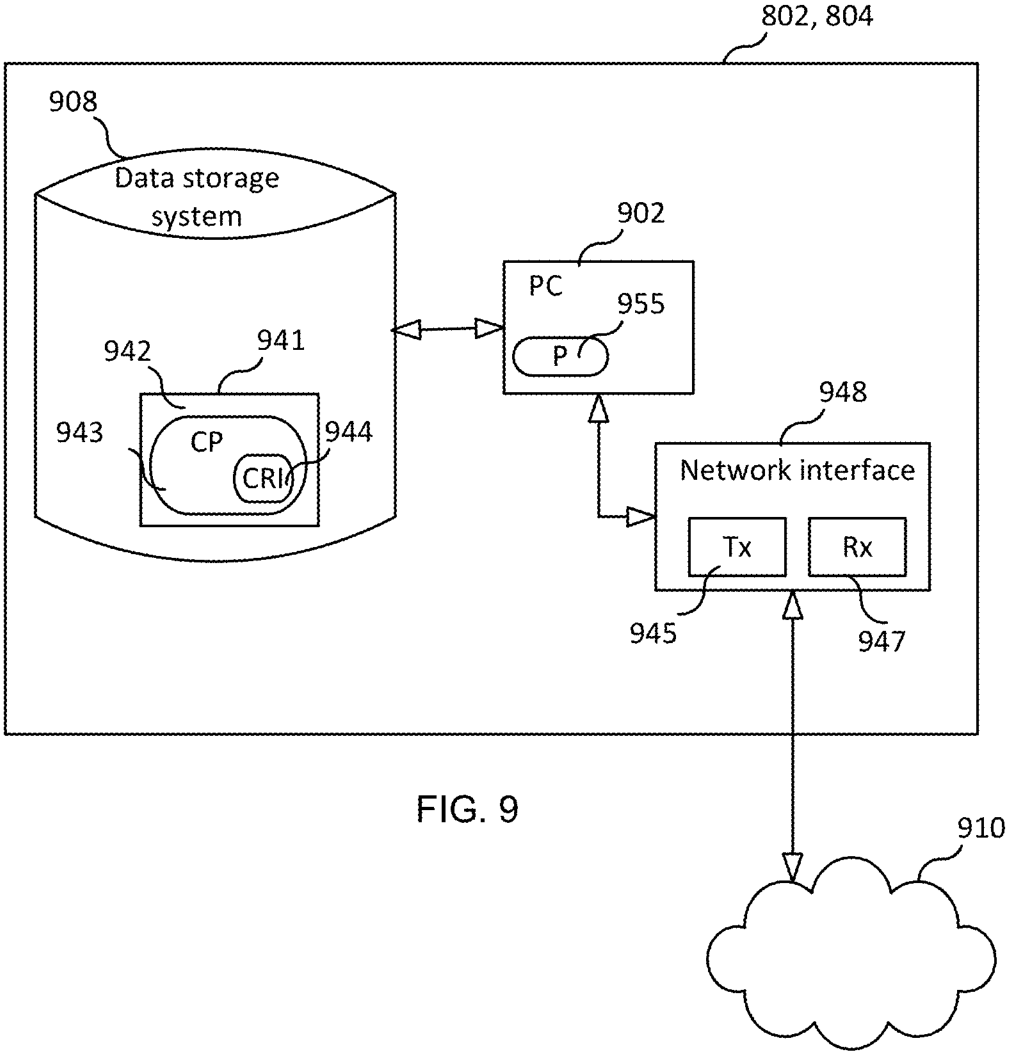
FIG. 9 is a block diagram of a node, according to embodiments.

FIG. 9 is a block diagram of a node (such as nodes 802 and 804), according to some embodiments. As shown in FIG. 9, the node may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling the node to transmit data to and receive data from other nodes connected to a network 910 (e.g., an Internet Protocol (IP) network) to which network interface 948 is connected; and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes the node to perform steps described herein (e.g., steps described herein with reference to the flow charts). In other embodiments, the node may be configured to perform steps described herein without the need for code. That is, for example, PC 902 may consist merely of one or more ASICs. Hence, the features of the embodiments described herein may be implemented in hardware and/or software.

SUMMARY OF VARIOUS EMBODIMENTS

A1. A method of audio rendering, the method comprising: receiving an audio element, wherein the audio element comprises: i) an interior representation of the audio element such that the interior representation of the audio element is valid within a spatial region, the interior representation of the audio element being in a listener-centric format and ii) information indicating the spatial region; determining that a listener is outside the spatial region; deriving an exterior representation of the audio element; and rendering the audio element using the exterior representation of the audio element.

A2. The method of embodiment A1, wherein the exterior representation of the audio element is derived from the interior representation of the audio element.

A3. The method of embodiment A1 or A2, wherein the audio element further comprises information indicating how the exterior representation of the audio element is to be derived such that the exterior representation of the audio element is valid outside the spatial region, and deriving the exterior representation of the audio element comprises deriving the exterior representation of the audio element based on the information indicating how the exterior representation the audio element is to be derived.

A4. The method of any one of embodiments A1-A3, further comprising: detecting that the listener has moved within the spatial region; and rendering the audio element using the interior representation of the audio element.

A5. The method of any one of embodiments A1-A4, further comprising: determining that the listener is within a first distance from the spatial region; determining that the first distance is less than a transition threshold value; and as a result of determining that the first distance is less than a transition threshold value, transitioning gradually between the interior representation of the audio element and the exterior representation of the audio element based on the first distance.

A6. The method of embodiment A5, wherein transitioning gradually between the interior representation of the audio element and the exterior representation of the audio element based on the first distance comprises cross-fading between the interior representation of the audio element and the exterior representation of the audio element based on the first distance.

A7. The method of any one of embodiments A3-A6, wherein the information indicating how the exterior representation of the audio element is to be derived indicates that the exterior representation of the audio element is to be derived from the interior representation.

A8. The method of any one of embodiments A3-A7, wherein the information indicating how the exterior representation of the audio element is to be derived includes a downmix matrix.

A9. The method of any one of embodiments A3-A6, wherein the information indicating how the exterior representation of the audio element is to be derived comprises a set of signals representing the exterior representation of the audio element.

A10. The method of any one of embodiments A1-A9, wherein the interior representation of the audio element is represented by one or more of (i) a channel-based audio scene representation, and (ii) an ambisonics audio scene representation.

A11. The method of any one of embodiments A1-A10, wherein deriving the exterior representation of the audio element is further based on one or more of a position or an orientation of the listener.

B1. A method, the method comprising: providing, to a rendering node, an audio element, wherein the audio element comprises: i) an interior representation of the audio element such that the interior representation of the audio element is valid within a spatial region, the interior representation of the audio element being in a listener-centric format and ii) information indicating the spatial region, wherein the audio element further comprises information indicating how an exterior representation of the audio element is to be derived such that the exterior representation of the audio element is valid outside the spatial region.

B2. The method of embodiment B1, wherein the information indicating how the exterior representation of the audio element is to be derived indicates that the exterior representation of the audio element is to be derived from the interior representation of the audio element.

B3. The method of embodiment B1 or B2, wherein the information indicating how the exterior representation of the audio element is to be derived includes a downmix matrix.

B4. The method of embodiment B1, wherein the information indicating how the exterior representation of the audio element is to be derived includes a set of signals representing the exterior representation of the audio element.

B5. The method of any one of embodiments B1-B4, wherein the interior representation of the audio element is represented by one or more of: i) a channel-based audio scene representation and ii) an ambisonics audio scene representation.

B6. The method of any one of embodiments B1-B5, wherein for points close to a boundary of the spatial region there is a gradual transition between the internal representation of the audio element and external representation of the audio element.

C1. A method of audio rendering, the method comprising: receiving an audio element, wherein the audio element comprises: i) an interior representation of the audio element such that the interior representation of the audio element is valid within a spatial region, the interior representation of the audio element being in a listener-centric format and ii) information indicating the spatial region; determining that a listener is within the spatial region; and rendering the audio element using the interior representation of the audio element, wherein the audio element further comprises information indicating how an exterior representation of the audio element is to be derived such that the exterior representation of the audio element is valid outside the spatial region.

C2. The method of embodiment C1, further comprising: detecting that the listener has moved outside the spatial region; deriving the exterior representation of the audio element; and rendering the audio element by using the exterior representation of the audio element.

C3. The method of embodiment C2, wherein deriving the exterior representation of the audio element is based on the information indicating how the exterior representation of the audio element is to be derived.

C4. The method of any one of embodiments C2 or C3, wherein deriving the exterior representation of the audio element is further based on one or more of a position or an orientation of the listener.

C5. The method of any one of embodiments C1-C4, further comprising: determining that the listener is within a first distance from the spatial region; determining that the first distance is less than a transition threshold value; and as a result of determining that the first distance is less than a transition threshold value, transitioning gradually between the exterior representation of the audio element and the interior representation of the audio element based on the first distance.

C6. The method of embodiment C5, wherein transitioning gradually between the interior representation of the audio element and the exterior representation of the audio element based on the first distance comprises cross-fading between the interior representation of the audio element and the exterior representation of the audio element based on the first distance.

C7. The method of any one of embodiments C1-C6, wherein the information indicating how the exterior representation of the audio element is to be derived indicates that the exterior representation of the audio element is to be derived from the interior representation of the audio element.

C8. The method of any one of embodiments C1-C7, wherein the information indicating how the exterior representation of the audio element is to be derived includes a downmix matrix.

C9. The method of any one of embodiments C1-C7, wherein the information indicating how the exterior representation of the audio element is to be derived includes a set of signals representing the exterior representation of the audio element.

C10. The method of any one of embodiments C1-C9, wherein the interior representation of the audio element is represented by one or more of: i) a channel-based audio scene representation and ii) an ambisonics audio scene representation.

C12. The method of any one of embodiments C1-C11, wherein for points close to a boundary of the spatial region there is a gradual transition between the internal representation of the audio element and external representation of the audio element.

PA1. A method of providing a spatially-bounded audio element, the method comprising: providing, to a rendering node, an audio element, wherein the audio element comprises: (i) an interior representation such that the interior representation is valid within a spatial region, the interior representation being in a listener-centric format; and (ii) information indicating the spatial region.

PA1a. The method of embodiment PA1, wherein the audio element further comprises (iii) information indicating how an exterior representation is to be derived, such that the exterior representation is valid outside the spatial region.

PA2. The method of embodiment PA1a, wherein the information indicating how an exterior representation is to be derived indicates that the exterior representation is to be derived from the interior representation.

PA3. The method of any one of embodiments PA1a-PA2, wherein the information indicating how an exterior representation is to be derived includes a downmix matrix.

PA4. The method of embodiment PA1a, wherein the information indicating how an exterior representation is to be derived includes a set of signals representing the exterior representation.

PA5. The method of any one of embodiments PA1-PA4, wherein the interior representation is represented by one or more of (i) a channel-based audio scene representation, and (ii) a higher order ambisonics (HOA) audio scene representation.

PA6. The method of any one of embodiments PA1-PA5, wherein for points close to a boundary of the spatial region, a difference between the internal representation and external representation is small, such that there is a smooth transition between the internal representation and external representation.

PB1. A method of rendering a spatially-bounded audio element, the method comprising: receiving an audio element, wherein the audio element comprises: (i) an interior representation such that the interior representation is valid within a spatial region, the interior representation being in a listener-centric format; and (ii) information indicating the spatial region; determining that a listener is within the spatial region; and rendering the audio element by using the interior representation of the audio element.

PB1a. The method of embodiment PB1, wherein the audio element further comprises (iii) information indicating how an exterior representation is to be derived, such that the exterior representation is valid outside the spatial region.

PB2. The method of any one of embodiments PB1 and B1a, further comprising: detecting that the listener has moved outside the spatial region; deriving the exterior representation of the audio element; and rendering the audio element by using the exterior representation of the audio element.

PB2a. The method of embodiment PB2, wherein deriving the exterior representation of the audio element is based on the information indicating how the exterior representation is to be derived.

PB3. The method of any one of embodiments PB1-PB2a, further comprising: determining that the listener is within a first distance from the spatial region; determining that the first distance is less than a transition threshold value; and as a result of determining that the first distance is less than a transition threshold value, cross-fading from the exterior representation to the interior representation based on the first distance.

PB4. The method of any one of embodiments PB1-PB3, wherein the information indicating how an exterior representation is to be derived indicates that the exterior representation is to be derived from the interior representation.

PB5. The method of any one of embodiments PB1-PB4, wherein the information indicating how an exterior representation is to be derived includes a downmix matrix.

PB6. The method of any one of embodiments PB1-PB3, wherein the information indicating how an exterior representation is to be derived includes a set of signals representing the exterior representation.

PB7. The method of any one of embodiments PB1-PB6, wherein the interior representation is represented by one or more of (i) a channel-based audio scene representation, and (ii) a higher order ambisonics (HOA) audio scene representation.

PB8. The method of any one of embodiments PB1-PB7, wherein for points close to a boundary of the spatial region, a difference between the internal representation and external representation is small, such that there is a smooth transition between the internal representation and external representation.

PB9. The method of any one of embodiments PB2-PB8, wherein deriving the exterior representation of the audio element is further based on one or more of a position and an orientation of the listener.

PC1. A method of rendering a spatially-bounded audio element, the method comprising: receiving an audio element, wherein the audio element comprises: (i) an interior representation such that the interior representation is valid within a spatial region, the interior representation being in a listener-centric format; and (ii) information indicating the spatial region; determining that a listener is outside the spatial region; deriving an exterior representation of the audio element; and rendering the audio element by using the exterior representation of the audio element.

PC1a. The method of embodiment PC1, wherein the exterior representation of the audio element is derived from the interior representation.

PC1b. The method of embodiment PC1, wherein the audio element further comprises (iii) information indicating how the exterior representation is to be derived, such that the exterior representation is valid outside the spatial region; and wherein deriving the exterior representation of the audio element is based on the information indicating how the exterior representation is to be derived.

PC2. The method of any one of embodiments PC1, C1a, and C1b, further comprising: detecting that the listener has moved within the spatial region; and rendering the audio element by using the interior representation of the audio element.

PC3. The method of any one of embodiments PC1-PC2, further comprising: determining that the listener is within a first distance from the spatial region; determining that the first distance is less than a transition threshold value; and as a result of determining that the first distance is less than a transition threshold value, cross-fading from the interior representation to the exterior representation based on the first distance.

PC4. The method of any one of embodiments PC1b-PC3, wherein the information indicating how an exterior representation is to be derived indicates that the exterior representation is to be derived from the interior representation.

PC5. The method of any one of embodiments PC1b-PC4, wherein the information indicating how an exterior representation is to be derived includes a downmix matrix.

PC6. The method of any one of embodiments PC1b-PC3, wherein the information indicating how an exterior representation is to be derived includes a set of signals representing the exterior representation.

PC7. The method of any one of embodiments PC1-PC6, wherein the interior representation is represented by one or more of (i) a channel-based audio scene representation, and (ii) a higher order ambisonics (HOA) audio scene representation.

PC8. The method of any one of embodiments PC1-PC7, wherein for points close to a boundary of the spatial region, a difference between the internal representation and external representation is small, such that there is a smooth transition between the internal representation and external representation.

PC9. The method of any one of embodiments PC1-PC8, wherein deriving the exterior representation of the audio element is further based on one or more of a position and an orientation of the listener.

PD1. A node (e.g., a decoder) for providing a spatially-bounded audio element, the node adapted to: provide, to a rendering node, an audio element, wherein the audio element comprises: (i) an interior representation such that the interior representation is valid within a spatial region, the interior representation being in a listener-centric format; and (ii) information indicating the spatial region.

PE1. A node (e.g., a rendering node) for rendering a spatially-bounded audio element, the node adapted to: receive an audio element, wherein the audio element comprises: (i) an interior representation such that the interior representation is valid within a spatial region, the interior representation being in a listener-centric format; and (ii) information indicating the spatial region; determine whether a listener is within the spatial region or outside the spatial region; and if the listener is within the spatial region: render the audio element by using the interior representation of the audio element; otherwise, if the listener is outside the spatial region: derive an exterior representation of the audio element; and render the audio element by using the exterior representation of the audio element.

PF1. A node (e.g., a decoder) for providing a spatially-bounded audio element, the node comprising: a providing unit configured to provide, to a rendering node, an audio element, wherein the audio element comprises: (i) an interior representation such that the interior representation is valid within a spatial region, the interior representation being in a listener-centric format; and (ii) information indicating the spatial region.

PG1. A node (e.g., a rendering node) for rendering a spatially-bounded audio element, the node comprising: a receiving unit configured to receive an audio element, wherein the audio element comprises: (i) an interior representation such that the interior representation is valid within a spatial region, the interior representation being in a listener-centric format; and (ii) information indicating the spatial region a determining unit configured to determine whether a listener is within the spatial region or outside the spatial region; and a rendering unit and a deriving unit; wherein if the determining unit determines that the listener is within the spatial region: the rendering unit is configured to render the audio element by using the interior representation of the audio element; and otherwise, if the determining unit determines that the listener is outside the spatial region: the deriving unit is configured to derive an exterior representation of the audio element; and the rendering unit is configured to render the audio element by using the exterior representation of the audio element.

PH1. A computer program comprising instructions which when executed by processing circuitry of a node causes the node to perform the method of any one of A1-A6, B1-B9, and C1-C9.

PH2. A carrier containing the computer program of embodiment PH1, wherein the carrier is one of an electronic signal, an optical signal, a radio signal, and a computer readable storage medium.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of audio rendering, the method comprising:

obtaining an interior representation of an audio element, wherein the interior representation is valid within a spatial region;

receiving information indicating the spatial region;

using the interior representation of the audio element to derive audio signals for an exterior representation of the audio element; and rendering the audio element using the derived audio signals for the exterior representation of the audio element, wherein using the interior representation of the audio element to derive the audio signals for the exterior representation of the audio element comprises deriving the audio signals for the exterior representation using a set of virtual microphones, and each virtual microphone included in the set of virtual microphones captures a direction of a sound field described by the interior representation.

2. The method of claim 1, wherein the interior representation of the audio element is in a listener-centric format.

3. The method of claim 1, wherein the set of virtual microphones comprises:

a first virtual microphone that captures a first direction of the sound field; and a second virtual microphone that captures a second direction of the sound field, the second direction being different than the first direction, and deriving the audio signals for the exterior representation using the set of virtual microphones comprises forming a downmix using a first signal corresponding to the first virtual microphone and a second signal corresponding to the second virtual microphone.

4. The method of claim 1, wherein the method further comprises:

receiving metadata for the audio element, wherein the metadata comprises information indicating that the audio signals for the exterior representation are to be derived from the interior representation.

5. The method of claim 1, further comprising:

detecting that a listener has moved into the spatial region; and as a result of detecting that the listener has moved into the spatial region, rendering for the listener the audio element using the interior representation of the audio element.

6. The method of claim 5, wherein rendering the audio element for the listener using the interior representation of the audio element comprises producing audio for the listener for causing the listener to experience being surrounded by a sound field.

7. The method of claim 1, further comprising:

determining that the listener is within a first distance from the spatial region;

determining that the first distance is less than a transition threshold value; and as a result of determining that the first distance is less than a transition threshold value, transitioning gradually between the interior representation of the audio element and the exterior representation of the audio element based on the first distance.

8. The method of claim 1, wherein the method further comprises determining that a listener is outside the spatial region, and the rendering of the audio element using the derived audio signals for the exterior representation of the audio element is performed as a result of determining that the listener is outside the spatial region.

9. The method of claim 1, wherein the interior representation of the audio element is represented by a channel-based audio scene representation and/or an ambisonics audio scene representation.

10. A non-transitory computer readable medium storing a computer program comprising instructions for causing processing circuitry to perform the method of claim 1.

11. An audio rendering apparatus for audio rendering, the audio rendering apparatus comprising:

a computer readable storage medium; and processing circuitry coupled to the computer readable storage medium, wherein the apparatus is configured to perform a method comprising:

obtaining an interior representation of an audio element, wherein the interior representation is valid within a spatial region;

receiving information indicating the spatial region;

using the interior representation of the audio element to derive audio signals for an exterior representation of the audio element; and rendering the audio element using the derived audio signals for the exterior representation of the audio element, wherein using the interior representation of the audio element to derive the audio signals for the exterior representation of the audio element comprises deriving the audio signals for the exterior representation using a set of virtual microphones, wherein each virtual microphone included in the set of virtual microphones captures a direction of a sound field described by the interior representation.

* * * * *